United States Patent [19]

Misawa et al.

[11] Patent Number: 4,567,225

[45] Date of Patent: Jan. 28, 1986

[54] RUBBER COMPOSITION FOR TIRE TREADS

[75] Inventors: Makoto Misawa, Hiratsuka; Tetsuya Mizoguchi, Isehara; Kinya Kawakami, Ninomiyamachi; Asahiro Ahagon, Fujisawa, all of Japan

[73] Assignee: The Yokohama Rubber Co., Ltd., Tokyo, Japan

[21] Appl. No.: 751,906

[22] Filed: Jul. 5, 1985

[51] Int. Cl.$^4$ .................. C08L 7/00; C08L 9/00; C08L 9/06

[52] U.S. Cl. ............................ 524/526; 525/236; 525/237; 525/333.2

[58] Field of Search .............. 525/236, 237, 333.2; 524/526

[56] References Cited

U.S. PATENT DOCUMENTS

| | | | |
|---|---|---|---|
| 4,321,168 | 3/1982 | Ueda et al. | 525/236 |
| 4,396,052 | 8/1983 | Ahagon et al. | 525/236 |
| 4,530,959 | 7/1985 | Armbruster et al. | 525/236 |

*Primary Examiner*—Allan M. Lieberman
*Attorney, Agent, or Firm*—Armstrong, Nikaido, Marmelstein & Kubovcik

[57] ABSTRACT

A rubber composition for tire tread, comprising natural rubber and/or polyisoprene rubber and polybutadiene rubber, which polybutadiene rubber having a 1,2-bond unit content in the range of 40 to 90 mol % and having a specific functional group contained in the molecular chain thereof.

16 Claims, 2 Drawing Figures

RUBBER COMPOSITION FOR TIRE TREADS

BACKGROUND OF THE INVENTION

This invention relates to a rubber composition for tire treads which is capable of providing a tire satisfying both of the requirement for reducing the rolling resistance and that for improving the wet braking property of the tire.

In recent years, in view of an increasingly made public demand for saving resources and energies, there have been made studies toward development of automobiles which call for no heavy gasoline consumption and it is sought for to expedite studies devoted to the so-called fuel-saving tires capable of alleviating the rolling loss, besides studies on improvement of engines.

In this connection, it is widely known that the consumption of gasoline by an automobile is cut by decreasing the resistance to the rolling of its tires. The quality, namely kind and physical properties, of the tread rubber is counted among major factors which determine the rolling resistance of tires. Desired decrease of the rolling resistance can be attained by using a material of a low glass transition point, or a material of a low hysteresis loss. For example, it is known that the styrene-butadiene copolymer rubber (SBR) which is widely used as tread rubber is substituted with a low-styrene SBR or a blend of SBR with natural rubber (NR) or polybutadiene rubber (BR) to reduce the rolling resistance. However, these substitutes extremely degrade the traveling stability such as the wet skidding property and wet braking property. In this respect, it is known to be extremely difficult to attain a reduction of the rolling resistance and yet attain an improvement in the traveling stability on wet road surfaces.

It has been introduced to the art by, for example, Proceedings of The Royal Society A 274,21 (1963) that for the purpose of improving the coefficient of friction on wet road surfaces, it is recommended to use, as tread rubber, a material which has a large value of the hysteresis loss and can dissipate the deforming energy exerted to rubber. This is because the surface of tire tread in contact with the road surface is deformed with rapid bobs by fine rises and falls on the road surface and, as a result thereof, the frictional force increases in proportion as the dissipation of energy by the mechanical loss increases. However, when the tire tread is made of a material having a higher hysteresis loss, it generates a larger amount of heat during the rolling of tire and does not exhibit a desirable resistance to the rolling.

SUMMARY OF THE INVENTION

This invention aims to provide a rubber composition for the tire tread free from the disadvantage described above, and more particularly, a rubber composition for tire tread capable of providing tires satisfying the requirements for a reduced rolling resistance and an improved wet braking property at the same time. The present inventors, after a diligent study, have found that a rubber composition answering the foregoing requirements is obtained by using polybutadiene rubber possessing a relatively high 1,2-bond unit content (hereinafter referred to as "VBR") and having a specific functional group incorporated in the molecular chain thereof in combination with natural rubber and/or polyisoprene rubber.

This invention essentially consists in a rubber composition for tire tread, which comprises a total of 100 parts by weight of rubber components including 50 to 90 parts by weight of natural rubber and/or polyisoprene rubber and 10 to 50 parts by weight of polybutadiene rubber, the polybutadiene rubber having a 1,2-bond content in the range of 40 to 90 mol % and having within the molecular chain thereof at least one atomic group represented by the following formula:

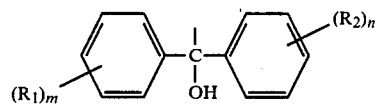

(wherein $R_1$ and $R_2$ each denotes a hydrogen atom or a substituent, and m and n each denotes an integer in the range of 1 to 5) joined in the form of a carbon-carbon bond to the aforementioned molecular chain.

DETAILED DESCRIPTION OF THE INVENTION

Figure 1:
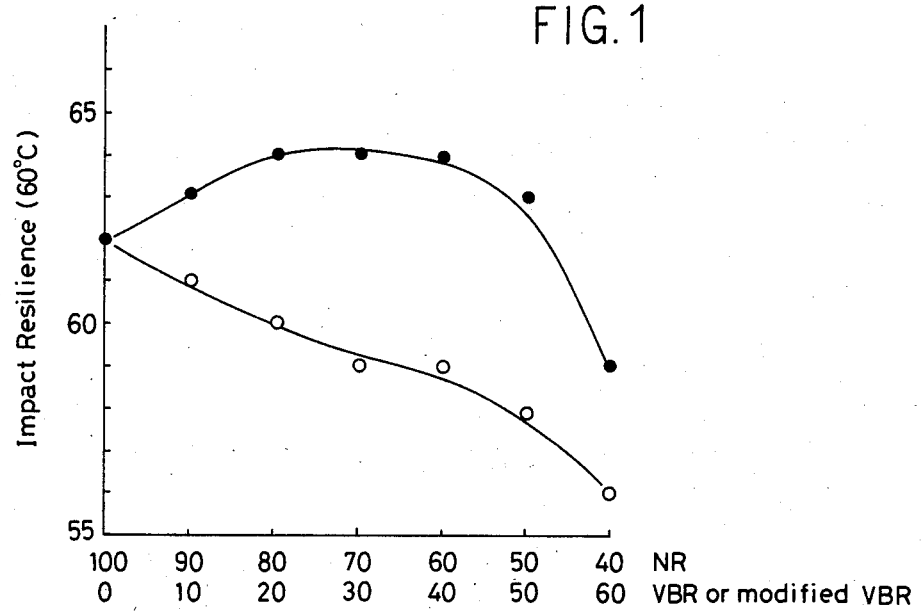
FIG. 1 and FIG. 2 are diagrams showing the relation between the mixing ratio of natural rubber and polybutadiene and the impact resilience.

The polybutadiene rubber which is used in the present invention has a 1,2-bond content in the range of 40 to 90 mol % and has within the molecular chain thereof at least one atomic group represented by the following formula (1),

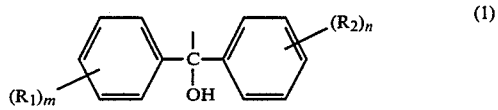

joined in the form of carbon-carbon bond to the aforementioned molecular chain (hereinafter referred to as "modified VBR").

In the atomic group represented by the above formula (1), $R_1$ and $R_2$ each denotes a hydrogen atom or a substituent. This substituent is not specifically defined. Examples of the substituent include amino group, alkylamino group, and dialkylamino group. In the formula, m and n each denotes an integer in the range of 1 to 5.

A polybutadiene having at least one such atomic group joined in the form of a carbon-carbon bond to the molecular chain, namely a modified VBR, is produced by polymerizing butadiene in the presence of an alkali metal-based catalyst and, after completion of the polymerization, adding a benzophenone to the polybutadiene rubber solution resulting from the polymerization. The alkali metal-based catalyst to be used in this polymerization has a metal element such as lithium, sodium, rubidium, or cesium. The benzophenone to be introduced into the polybutadiene rubber is in the amount of at least one atom per one molecular chain of the rubber (namely 0.05 to 1.0 part by weight per 100 parts by weight of the rubber) on the average. Preferably this benzophenone is of a type having the at least one amino group, alkylamino group, or dialkylamino group in either or both of the benzene ring of the formula (2) shown below.

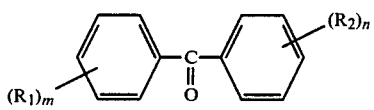

Concrete examples of the benzophenone answering this description include 4,4'-bis(dimethylamino)benzophenone, 4,4'-bis(diethylamino)-benzophenone, 4,4'-bis(dibutylamino)-benzophenone, 4,4'-diaminobenzophenone, and 4-dimethylaminobenzophenone.

The rubber composition of this invention has a total of 100 parts by weight of rubber components including 50 to 90 parts by weight of natural rubber and/or polyisoprene rubber and 10 to 50 parts by weight of the aforementioned polybutadiene rubber. When the rubber components are contained in amounts falling outside the ranges mentioned above, the reduction of rolling resistance and the improvement of wet braking property aimed at by the present invention can hardly simultaneously be attained.

The rubber composition of this invention is allowed to incorporate, besides the aforementioned elastomer, some other elastomer such as, for example, either polybutadiene having a 1,2-bond unit content of not more than 20% or a styrene-butadiene copolymer rubber having a bound styrene content in the range of 18 to 28% by weight for the purpose of enabling the rubber composition to retain a fracture resisting property, a wear resisting property and other attributes required for tire tread, in a well balanced state on the condition that the simultaneous improvement in the wet braking property and in the rolling resisting property aimed at by this invention is not impaired by the incorporation. The amount of this additionally incorporated rubber component is not more than 40 parts by weight based on the mixed elastomer [i.e. 100 parts by weight of all the elastomers including the additionally incorporated rubber components (the total of 100 parts by weight of rubber components)].

Further, for this invention, it is desirable to incorporate 1 to 40 parts by weight of a softening agent and 5 to 70 parts by weight of carbon black, respectively based on 100 parts by weight of the blended rubber (the total of 100 parts by weight of rubber components). If the amount of the softening agent exceeds 40 parts by weight or that of carbon black exceeds 70 parts by weight, there ensues the disadvantage that the heat generating property is aggravated and the rolling resistance is intensified.

The rubber composition of this invention is further allowed to incorporate such ingredients as vulcanizer, vulcanization accelerator, antioxidant, peptizer, and tackifier which are generally used in the field of rubber industry.

Now, the effect of the present invention will be described specifically below with reference to working examples and comparative examples.

EXAMPLES AND COMPARATIVE EXAMPLES

Rubber compositions of a variety of compositions as shown in Table 1 below were prepared, vulcanized, and tested for impact resilience. The compositions were used in tire tread of tires, size 165 SR 13, and tested for the rolling resistance, wet braking property, and braking property on ice. The results are shown in Table 3.

The modified VBR used in the cap tread rubber was prepared by solution polymerizing butadiene in the presence of n-butyl lithium as a catalyst until completion of the polymerization thereby producing a VBR solution having active lithium added to the end of the molecular chain thereof, adding to the VBR solution 4,4'-bis(dimethylamino)-benzophenone in an amount of 1.5 times the amount of the catalyst, stirring the mixture to induce reaction, allowing the resultant blend to solidify, and drying the solidified mass. In contrast to the modified VBR, other unmodified species of VBR were prepared by following the procedure described above, except that the addition of 4,4'-bis(dimethylamino)-benzophenone to the VBR solution resulting from the solution polymerization was not made. Properties of the polylmers used are shown in Table 2.

TABLE 1

| Polymer (1) | 100 parts by weight |
| --- | --- |
| Zinc white | 3 parts by weight |
| Stearic acid | 2 parts by weight |
| Antioxidant (2) | 2 parts by weight |
| Carbon black (3) | 50 parts by weight |
| Softening agent (4) | 8 parts by weight |
| Vulcanization accelerator (5) | 0.8 part by weight |
| Sulfur | 2.0 parts by weight |

Notes:
(1) For polymer composition, refer to Table 3.
(2) N—(1,3-dimethylbutyl)-N'—phenyl-P—phenylenediamine.
(3) ASTM designation N 339 and N 220.
(4) Fukkor Flex 1150 N, Fuji Kosan.
(5) N—oxydiethylene-2-benzothiazol sulfenamide.

TABLE 2

| | Microstructure of butadiene | | |
| --- | --- | --- | --- |
| | VBR | Modified VBR1 | Modified VBR2 |
| Amount of 1,2-bonds contained (*) | 70 | 71 | 51 |
| Mooney viscosity(**) ($ML_{1+4}100°$ C.) | 50 | 53 | 56 |

Notes:
(*)Measured by infrared spectroscopic analysis.
(**)Measured in accordance with the method of JIS K6300

The properties shown in Table 3 were determined by methods described below.

[Impact Resilience]

The method defined in JIS K6301 was followed with necessary modifications.

[Rolling Resistance]

This property was determined under the conditions of 1707 mm for the drum diameter, 1.9 kg/cm$^2$ for the internal tire pressure, 420 kg for the load, and 80 km/hr for the load velocity. The test results were compared in terms of relative rolling resistance such that Run No. 1 was chosen as the control for Run Nos. 1 to 15 and Run No. 16 was chosen as the control for Run Nos. 16 to 28. Of the test results reported, smaller values mean more desirable results.

[Wet Braking Property]

This property was determined by suddenly braking a test car running at a speed of 80 km/hr on a wet asphalt road surface covered with water in a depth of 2 to 3 mm and measuring the distance travelled by the test car from the point at which the wheels were locked to the point at which the test car was brought to a complete stop. The scale used for rating the test results is the same as that used for rating the rolling resistance. Smaller values found denote more desirable results.

[Braking Property on Ice]

This property was determined by suddenly braking a test car running at a speed of 30 km/hr on a smooth frozen road surface at an ice temperature of −10° C. and measuring the distance travelled by the test car from the point at which the wheels were locked to the point at which the test car was brought to a complete stop. The scale used for rating the test results is the same as that used for rating the rolling resistance. A smaller value found means a more desirable result.

resistance as well without degrading the remarkable wet braking property of VBR.

In other words, this invention overcomes the heretofore well-known contradictory relation between the reduction of rolling resistance and the improvement in wet braking property.

In the present invention, for the purpose of further improving the rolling resistance, there may be adopted a two-step mixing method which comprises kneading the rubber components minus a portion thereof with all the ingredients except for the vulcanizer and related

TABLE 3

| | \multicolumn{15}{c}{Run No.} | | | | | | | | | | | | | | |
|---|---|---|---|---|---|---|---|---|---|---|---|---|---|---|---|
| | 1 C.E. | 2 C.E. | 3 C.E. | 4 C.E. | 5 C.E. | 6 C.E. | 7 C.E. | 8 Ex. | 9 Ex. | 10 Ex. | 11 Ex. | 12 Ex. | 13 C.E. | 14 Ex. | 15 Ex. |
| NR | 100 | 90 | 80 | 70 | 60 | 50 | 40 | 90 | 80 | 70 | 60 | 50 | 40 | 60 | 20 + 40* |
| VBR | | 10 | 20 | 30 | 40 | 50 | 60 | | | | | | | | |
| Modified VBR1 | | | | | | | | 10 | 20 | 30 | 40 | 50 | 60 | | 40 |
| Modified VBR2 | | | | | | | | | | | | | | 40 | |
| N 339 carbon | 50 | 50 | 50 | 50 | 50 | 50 | 50 | 50 | 50 | 50 | 50 | 50 | 50 | 50 | 50 |
| Impact resilience at 60° C. | 62 | 61 | 60 | 59 | 59 | 58 | 56 | 63 | 64 | 64 | 64 | 63 | 59 | 65 | 65 |
| Wet braking property | 100 | 99 | 98 | 98 | 97 | 97 | 96 | 99 | 98 | 97 | 97 | 97 | 96 | 100 | 97 |
| Rolling resistance | 100 | 100 | 101 | 102 | 102 | 104 | 105 | 100 | 98 | 97 | 98 | 100 | 101 | 96 | 95 |
| Braking property on ice | 100 | | | | | | | 100 | 102 | 103 | 108 | 110 | | 107 | |

| | \multicolumn{14}{c}{Run No.} | | | | | | | | | | | | | |
|---|---|---|---|---|---|---|---|---|---|---|---|---|---|---|
| | 16 C.E. | 17 C.E. | 18 C.E. | 19 C.E. | 20 C.E. | 21 C.E. | 22 C.E. | 23 Ex. | 24 Ex. | 25 Ex. | 26 Ex. | 27 Ex. | 28 C.E. | 29 C.E. |
| NR | 100 | 90 | 80 | 70 | 60 | 50 | 40 | 90 | 80 | 70 | 60 | 50 | 40 | |
| SBR* | | | | | | | | | | | | | | 100 |
| VBR | | 10 | 20 | 30 | 40 | 50 | 60 | | | | | | | |
| Modified VBR1 | | | | | | | | 10 | 20 | 30 | 40 | 50 | 60 | |
| Modified VBR2 | | | | | | | | | | | | | | |
| N 339 carbon | | | | | | | | | | | | | | 50 |
| N 220 carbon | 50 | 50 | 50 | 50 | 50 | 50 | 50 | 50 | 50 | 50 | 50 | 50 | 50 | |
| Impact resilience at 60° C. | 59 | 58 | 57 | 57 | 56 | 55 | 53 | 62 | 63 | 63 | 62 | 60 | 59 | 54 |
| Wet braking property | 100 | 98 | 98 | 97 | 97 | 96 | 95 | 98 | 97 | 97 | 96 | 96 | 95 | 95 |
| Rolling resistance | 100 | 101 | 102 | 102 | 103 | 103 | 105 | 98 | 97 | 96 | 98 | 100 | 101 | 108 |
| Braking property on ice | | | | | | | | | | | | | | 115 |

*Mixing procedure: NR 20, modified VBR1 40 and ingredients other than vulcanizer and related ingredient were added in the first step, the remaining NR 40 was added in the second step, and the vulcanizer and related ingredient were added in the third step.
C.E. Comparative Experiment
Ex. Example
*Nipol #1502. (Nippon Geon Co., Ltd.)

FIG. 1 shows the relation between the value of impact resilience (vertical axis) and the mixing ratio of natural rubber (NR) and VBR or modified VBR1 (horizontal axis) with respect to Run Nos. 1–13 (carbon black N 339 used). It is clear from FIG. 1 that the impact resilience decreased in proportion to the increase in the mixing ratio of VBR to natural rubber but that the impact resilience increased in proportion to the increase in the amount of modified VBR up to 50 parts by weight. FIG. 1, therefore, indicates that the impact resilience increases and the rolling resistance correspondingly decreases when the modified VBR is incorporated in an amount of 10 to 50 parts by weight relative to 90 to 50 parts by weight of the natural rubber.

Figure 2:
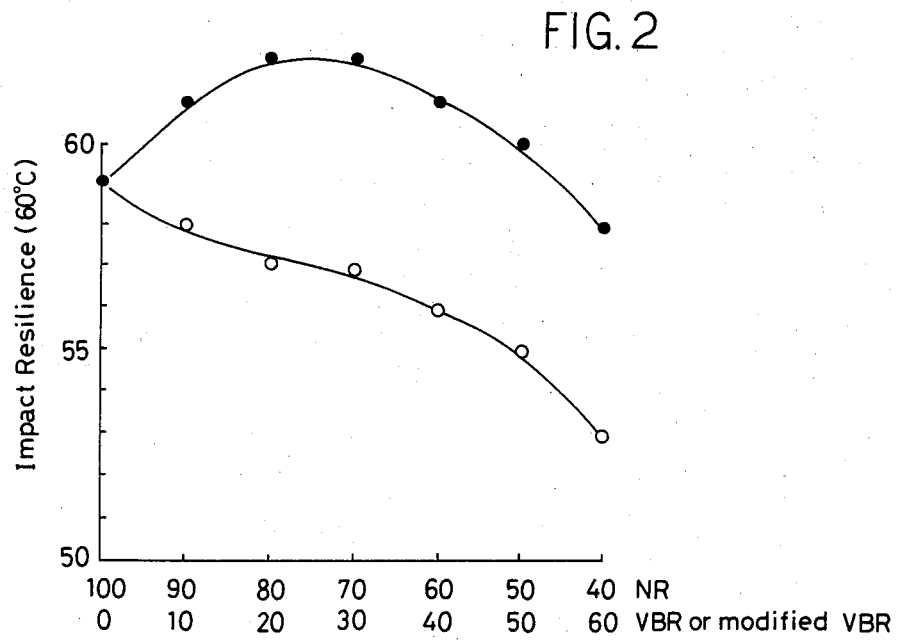

The same trend is evident in Run Nos. 16–28 using N 220 as carbon black (FIG. 2). In FIG. 1 and FIG. 2, the black dots (•) indicate the data of NR/modified VBR rubber compositions and the circles (o) indicate the data of NR/VBR rubber compositions.

The test results on the wet braking property indicate that this property improves in proportion as the increase of the amount of either VBR or modified VBR.

From these test results, it is logically inferred that the introduction of a specific functional group into the molecular chain of VBR serves to improve the rolling ingredient in the first step, and continuing the kneading of the rubber components plus the missing portion in the second step (Run No. 15).

It is further noted from Table 3 that the incorporation of modified VBR results in a decline of the braking property on ice as compared with the rubber composition not incorporating this modified VBR but that the extent of this decline is far slighter than that of the decline caused by the incorporation of the type of SBR heretofore widely used in radial tires for passenger cars (Run No. 29).

As described above, use of natural rubber or polyisoprene rubber in combination with a polymer obtained by introducing a specific functional group in the molecular chain of polybutadiene having a high 1,2-bond unit content not only enhances the wet braking property but also improves the rolling resistance without severely degrading the braking property on ice. The rubber composition of the present invention, therefore, proves useful advantageously in treads of passenger-car tires, particularly tires of a low rolling resistance, or in all-season tires.

We claim:

1. A rubber composition for tire treads, comprising a total of 100 parts by weight of rubber components including 50 to 90 parts by weight of natural rubber and- /or polyisoprene rubber and 10 to 50 parts by weight of polybutadiene rubber, which rubber composition is characterized by said polybutadiene rubber having a 1,2-bond unit content in the range of 40 to 90 mol % and having at least one atomic group per one molecular chain of the polybutadiene rubber so that there is 0.05 to 1 part by weight of said atomic group per 100 parts by weight of the polybutadiene rubber on the average, said atomic group being represented by the following formula:

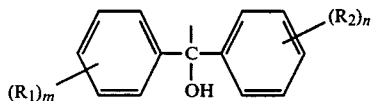

wherein $R_1$ and $R_2$ each denote a hydrogen atom or a substituent selected from the group consisting of an amino group, an alkylamino group, a dialkylamino group and combinations thereof and m and n each denote an integer in the range of 1 to 5, said atomic group being joined in the form of a carbon-carbon bond to the molecular chain of said polybutadiene rubber.

2. A rubber composition according to claim 1, wherein polybutadiene having a 1,2-bond unit content of not more than 20% or a styrene-butadiene copolymer rubber having a bound styrene content in the range of 18 to 28% by weight is additionally incorporated in an amount not more than 40 parts by weight based on a total of 100 parts by weight of rubber components.

3. A rubber composition according to claim 1, wherein a softening agent is incorporated in an amount of 1 to 40 parts by weight and carbon black in an amount of 5 to 70 parts by weight, respectively based on a total of 100 parts by weight of rubber components.

4. A rubber composition according to claim 2, wherein a softening agent is incorporated in an amount of 1 to 40 parts by weight and carbon black in an amount of 5 to 70 parts by weight, respectively based on a total of 100 parts by weight of rubber components.

5. A rubber composition according to claim 1, wherein said polybutadiene rubber has been obtained by polymerizing butadiene in the presence of an alkali metal-based catalyst and, after completion of the polymerization, adding a benzophenone to the polybutadiene rubber solution obtained by said polymerization.

6. A rubber composition according to claim 2, wherein said polybutadiene rubber has been obtained by polymerizing butadiene in the presence of an alkali metal-based catalyst and, after completion of the polymerization, adding a benzophenone to the polybutadiene rubber solution obtained by said polymerization.

7. A rubber composition according to claim 3, wherein said polybutadiene rubber has been obtained by polymerizing butadiene in the presence of an alkali metal-based catalyst and, after completion of the polymerization, adding a benzophenone to the polybutadiene rubber solution obtained by said polymerization.

8. A rubber composition according to claim 4, wherein said polybutadiene rubber has been obtained by polymerizing butadiene in the presence of an alkali metal-based catalyst and, after completion of the polymerization, adding a benzophenone to the polybutadiene rubber solution obtained by said polymerization.

9. A rubber composition according to claim 5, wherein said alkali metal-based catalyst has as a basal material thereof lithium, sodium, rubidium or cesium.

10. A rubber composition according to claim 6, wherein said alkali metal-based catalyst has as a basal material thereof lithium, sodium, rubidium or cesium.

11. A rubber composition according to claim 7, wherein said alkali metal-based catalyst has as a basal material thereof lithium, sodium, rubidium or cesium.

12. A rubber composition according to claim 8, wherein said alkali metal-based catalyst has as a basal material thereof lithium, sodium, rubidium or cesium.

13. A rubber composition according to claim 5, wherein said benzophenone is 4,4'-bis(dimethylamino)-benzophenone, 4,4'-bis(diethylamino)-benzophenone, 4,4'-bis(dibutylamino)-benzophenone, 4,4'-diaminobenzophenone or 4-dimethylaminobenzophenone.

14. A rubber composition according to claim 6, wherein said benzophenone is 4,4'-bis(dimethylamino)-benzophenone, 4,4'-bis(diethylamino)-benzophenone, 4,4'-bis(dibutylamino)-benzophenone, 4,4'-diaminobenzophenone or 4-dimethylaminobenzophenone.

15. A rubber composition according to claim 7, wherein said benzophenone is 4,4'-bis(dimethylamino)-benzophenone, 4,4'-bis(diethylamino)-benzophenone, 4,4'-bis(dibutylamino)-benzophenone, 4,4'-diaminobenzophenone or 4-dimethylaminobenzophenone.

16. A rubber composition according to claim 8, wherein said benzophenone is 4,4'-bis(dimethylamino)-benzophenone, 4,4'-bis(diethylamino)-benzophenone, 4,4'-bis(dibutylamino)-benzophenone, 4,4'-diaminobenzophenone or 4-dimethylaminobenzophenone.

* * * * *